United States Patent
Bouyat

(10) Patent No.: US 8,570,526 B2
(45) Date of Patent: Oct. 29, 2013

(54) DEVICE FOR DIGITALLY PROCESSING INFORMATION OBTAINED FROM A GYROLASER AND ASSOCIATED GYROLASER

(75) Inventor: Stéphane Bouyat, Saint Cyr (FR)

(73) Assignee: Thales, Neuilley sur Seine (FR)

( * ) Notice: Subject to any disclaimer, the term of this patent is extended or adjusted under 35 U.S.C. 154(b) by 290 days.

(21) Appl. No.: 13/085,339

(22) Filed: Apr. 12, 2011

(65) Prior Publication Data

US 2011/0249269 A1    Oct. 13, 2011

(30) Foreign Application Priority Data

Apr. 13, 2010 (FR) ...................................... 10 01547

(51) Int. Cl.
*G01C 19/68* (2006.01)
(52) U.S. Cl.
USPC .......................................... 356/473; 356/472
(58) Field of Classification Search
USPC ........................................................ 356/473
See application file for complete search history.

(56) References Cited

U.S. PATENT DOCUMENTS

| 4,529,311 A |   | 7/1985 | Morgan et al. |
|---|---|---|---|
| 4,899,346 A | * | 2/1990 | Perkins ........................... 372/32 |
| 5,225,889 A |   | 7/1993 | Fritze et al. |
| 5,341,209 A |   | 8/1994 | Karpinski |

FOREIGN PATENT DOCUMENTS

GB    2 098 404 A    11/1982

* cited by examiner

*Primary Examiner* — Tarifur Chowdhury
*Assistant Examiner* — Omar Nixon
(74) *Attorney, Agent, or Firm* — Baker & Hostetler LLP

(57) ABSTRACT

A gyrolaser with optical cavity includes a plurality of mirrors, at least one photo-detector delivering two optical signals in phase quadrature, said signals being digitized. The position of one of said mirrors is controlled by conversion of an electrical signal into a mechanical force. The gyrolaser is activated in an oscillatory movement by conversion of an oscillation electrical signal into a mechanical force. The angular velocity of said gyrolaser is measured, and the phase $\alpha$ and the modulus $\rho$ or the square of the modulus $\rho$ are extracted from said optical signals.

15 Claims, 4 Drawing Sheets

DEVICE FOR DIGITALLY PROCESSING INFORMATION OBTAINED FROM A GYROLASER AND ASSOCIATED GYROLASER

CROSS-REFERENCE TO RELATED APPLICATION

This application claims priority to foreign French patent application No. FR 1001547, filed on Apr. 13, 2010, the disclosure of which is incorporated by reference in its entirety.

FIELD OF THE INVENTION

The present invention relates to a device for digitally processing information obtained from a gyrolaser and the associated gyrolaser.

This invention applies to any kind of gyrolaser, with gaseous amplifying medium or solid state, with triangular or square, mono-axial or triaxial resonant cavity.

BACKGROUND

A gyrolaser is a velocity sensor that uses a laser ray. It is used to measure angular rotation velocities of a mobile carrier. This type of equipment is notably used for aeronautical applications.

The gyrolaser, developed some thirty years ago, is widely marketed and used these days. Its operating principle is based on the Sagnac effect, which induces a frequency difference between two optical emission modes being propagated in opposite directions, called counter-propagating, in a laser cavity in the form of a bidirectional ring driven by a rotational movement. The laser cavity, generally square or triangular, is equipped at each of its corners with mirrors reflecting the two emitted signals.

On any gyrolaser, a number of locking loops are necessary to the optimal operation of the sensor in order to provide an optical signal containing angular velocity information concerning the mobile. There is thus:

- a cavity length locking loop whose function is to maintain the internal length of the cavity at a value that is a multiple of the wavelength of the two optical modes,
- an activation locking loop which aims to maintain an oscillatory movement making it possible to minimize the well-known blind region phenomenon,
- a laser powers locking loop which makes it possible to maintain the two optical signals at a constant level upstream of the angular velocity computation processing operations,
- a plasma discharge current locking loop making it possible to maintain a predefined current that is equal in each cavity.

In the known gyrolasers, a significant portion of these locking subsystems is implemented by analogue means which brings with it significant card surface area and limited reliability problems.

Furthermore, the activation locking loop generally uses a detection device placed on the activation wheel, for example a piezo-transducer, the transfer function of which may vary over time and lead to undetectable faults which will affect the activation locking mechanism with errors.

The present invention proposes, in order to mitigate the abovementioned problems, a solution making it possible to significantly reduce the manufacturing costs by reducing the analogue shaping stages and by eliminating the movement detection devices of the activation locking subsystem.

The proposed solution makes it possible, through a digitization of all of the processing operations, to optimize the integration and increase the reliability of the system. Finally, it makes it possible to guarantee excellent activation amplitude stability and to improve the long-term bias performance levels of the sensor, notably in the case of poorly compensated or uncompensated spurious movements.

SUMMARY OF THE INVENTION

To this end, the subject of the invention is a gyrolaser with optical cavity comprising a plurality of mirrors, at least one photo-detector delivering two optical signals in phase quadrature, said signals being digitized, means for controlling the position of one of said mirrors by conversion of an electrical signal into a mechanical force, means for activating said gyrolaser in an oscillatory movement by conversion of an oscillation electrical signal into a mechanical force and means for measuring the angular velocity of said gyrolaser, wherein it also comprises:

- means for extracting the phase $\alpha$ and the modulus $\rho$ or the square of the modulus $\rho$ of the vector whose real part is formed by one of the two digitized signals and the imaginary part is formed by the other digitized signal, said modulus $\rho$ representing the amplitude of said optical signals and its square representing their power,
- means for locking the length of the optical cavity onto a multiple of the wavelength of said optical signals by an estimation of the slope of the curve of variation of the amplitude or of the power as a function of time, said means producing a correction signal determined as a function of said slope and applied to said control means,
- means for deriving said phase $\alpha$ over a given period of time in order to produce a signal comprising the overall movement information for said gyrolaser,
- means for locking the activation of said gyrolaser onto said oscillatory movement, receiving said signal, extracting from which an estimation of the oscillatory movement imparted on said gyrolaser by said activation means and producing said oscillation signal whose amplitude is locked onto a given amplitude setpoint.

In a variant embodiment of the invention, the extraction of an estimation of the oscillatory movement is performed by a filtering eliminating, from said signal, the low frequencies below a given threshold.

In a variant embodiment of the invention, said activation locking means comprise at least means for

- rectifying said estimation of the oscillatory movement,
- subtracting the result of the rectification from an oscillation amplitude setpoint,
- integrating the result of the subtraction over a given time period,
- multiplying the result of the integration with said estimation phase-shifted by a given phase $\theta$ to obtain said oscillation signal.

In a variant embodiment of the invention, the phase shifting is performed by a phase-shifting filter or a phase-locked loop.

In a variant embodiment of the invention, the phase $\theta$ has a value of 180° or 90°.

In a variant embodiment of the invention, said means for locking the length of the optical cavity carry out at least the following steps:

- addition of a reference sinusoidal signal of given frequency and amplitude to the correction signal for said means for controlling the position of a mirror of said cavity, coherent demodulation of the amplitude or of the power of said signals.

In a variant embodiment of the invention, the coherent demodulation is performed by:
- a multiplication of the amplitude or of the power of said signals by said sinusoidal signal of given frequency and amplitude,
- an integration of the result of the multiplication over a given time period,
- an addition of the result of the integration and of said sinusoidal signal to produce said correction signal.

In a variant embodiment of the invention, said extraction means apply a Cordic algorithm.

In a variant embodiment of the invention, said square of the modulus ρ is filtered by a low-frequency filter.

In a variant embodiment of the invention, said gyrolaser further comprises automatic gain control means for locking the amplitude or the power of said signals onto a reference gain value.

In a variant embodiment of the invention, said control means comprise a piezo-transducer.

In a variant embodiment of the invention, said activation means comprise a mechanical activation wheel and a piezo-electric motor.

In a variant embodiment of the invention, said measurement means carry out a counting/downcounting of the pulses of said signals.

In a variant embodiment of the invention, said gyrolaser performs a measurement of the angular velocity according to the three axes of a trihedron and that the means for locking the length of the optical cavity further comprise a matrix-producing operation making it possible to transpose the reflection axes of the mirrors of the optical cavity towards the optical axes of the photo-detectors.

In a variant embodiment of the invention, the extraction of an estimation of the oscillatory movement is determined from the intercorrelation matrix of the three signals obtained by derivation of the phase α of said optical signals obtained for each of the three axes.

BRIEF DESCRIPTION OF THE DRAWINGS

Other characteristics will become apparent from reading the following detailed description, given as a nonlimiting example, in light of the appended drawings in which.

DETAILED DESCRIPTION

Figure 1:
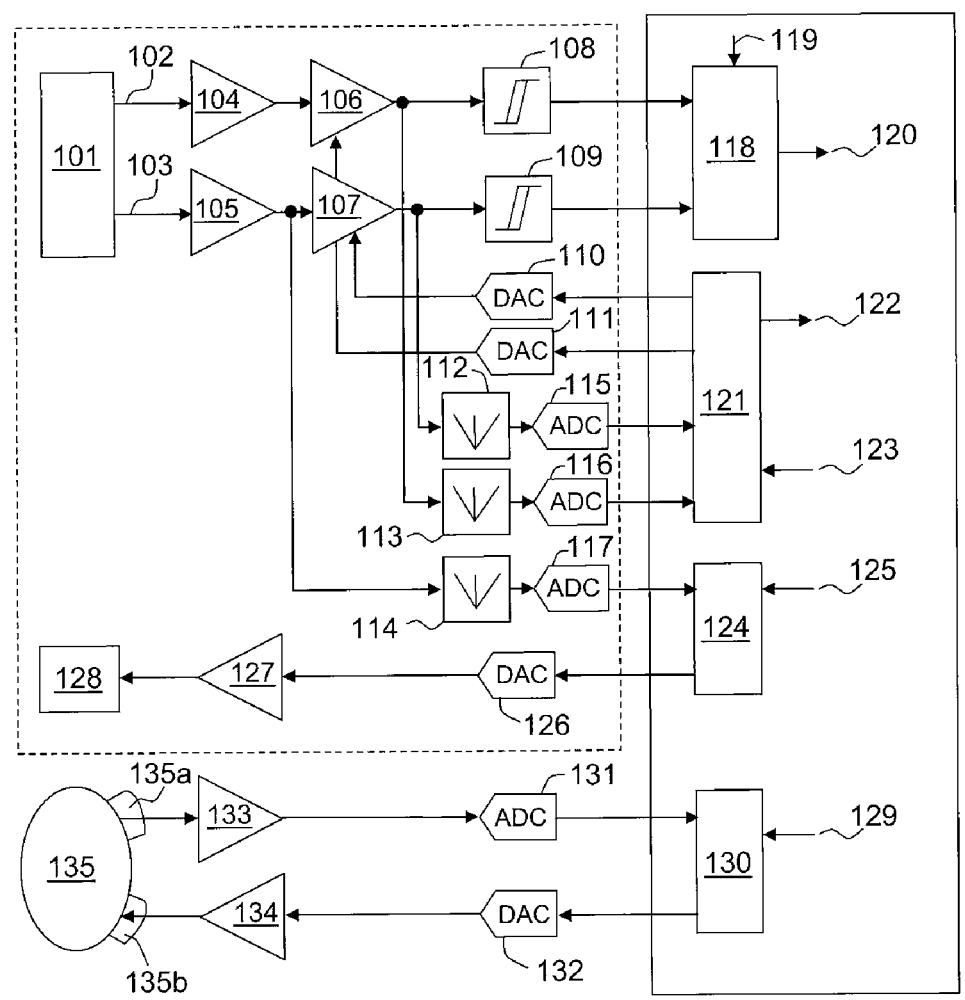
FIG. 1 represents a diagram illustrating a state-of-the-art solution for processing information obtained from a gyrolaser.

FIG. 1 represents the processing electronics of a gyrolaser according to the current state of the art. Only the elements necessary to an understanding of the invention are represented, in particular the optical cavity and the plasma current locking loop are not illustrated in the figure. The dotted line box contains all the analogue signal processing operations, the solid line box identifies the digital processing operations.

A photo-detector 101, for example a photoelectric cell or any other sensor transforming the light that it absorbs into a measurable electrical quantity, receives two sinusoidal signals, phase-shifted by 90°, corresponding to the two counter-propagating laser waves that have passed through the optical cavity of the gyrolaser in opposite directions and delivers two electrical signals 102, 103. These two signals 102, 103 are preamplified by fixed-gain low-noise amplifiers 104, 105 then amplified a second time by variable-gain amplifiers 106, 107. Two hysteresis comparators 108, 109 are applied to the two amplified sinusoidal signals in order to provide two square signals from which the angular velocity information 120 is determined by suitable means 118. The means 118 determine a measurement of the angular velocity from the number of pulses and their respective phases. A pulse is created when an interference fringe moves in front of the photo-detector. This fringe corresponds to a fixed and known angular rotational movement of the gyrolaser, dependent on its physical characteristics. If the number of pulses per time unit is counted, the angular rotation velocity is deduced therefrom. The time unit is determined by the sampling frequency 119. The relative phase of the signals may be reversed if the gyrometer revolves in the counterdirection, the measurement means 118 must therefore apply a counting and a downcounting of the pulses according to their relative phase.

The counter/downcounter 118 sampled at a fixed sampling frequency 119 is one known method for carrying out a measurement of the angular velocity in a gyrometer. Other known methods may be employed without departing from the context of the invention.

Laser Power Locking

Means 121 for automatically controlling the gain or the power of the laser signals 102, 103 control the two variable-gain amplifiers 106, 107 in order to lock the level of the signals onto a reference value 123, for example, a value of 1 volt/peak. To this end, the signals delivered at the output of the variable-gain amplifiers 106, 107 are rectified 112, 113 then digitized 115, 116 in order for the means 121 to determine a measurement of their average power then deliver two gain setpoints which are converted 110, 111, by analogue means to control the amplifiers 106, 107 in order to perform a locking of power onto the reference power 123 and also to conserve a correct mutual pairing of the two signals. The automatic gain control means 121 produce, for example, a digital corrector of proportional integral (PI) or proportional integral derivative (PID) type which delivers a digital control signal making it possible to lock the amplitude of the signals 102, 103 upstream of the comparators 108, 109 onto a fixed value.

One of the two signals 103, after fixed-gain preamplification 105, is sampled then rectified 114, and digitized 117 before being supplied as input for the means 124 for locking the length of the optical cavity of the gyrolaser.

Cavity Length Locking

For the interference fringes of the two optical modes to be detected with a good contrast and in order to optimize the performance levels of the gyrolaser, it is necessary to maintain the length of the optical cavity of the gyrolaser at a multiple of the wavelength of the laser signal. The term "cavity length" should be understood to mean the overall length of the path travelled by a wave inside the optical cavity after successive bounces on the internal mirrors of the cavity. For this property to be observed, one of the mirrors is mobile and is controlled by control means 128, for example a piezo-transducer or any other means making it possible to convert an electrical signal into a mechanical force, which permanently correct the cavity length to lock it onto a multiple of the wavelength of the signals. The control means 128 are activated by cavity length locking means 124 which deliver a correction information item which is digitized 126 and amplified 127.

Figure 2:
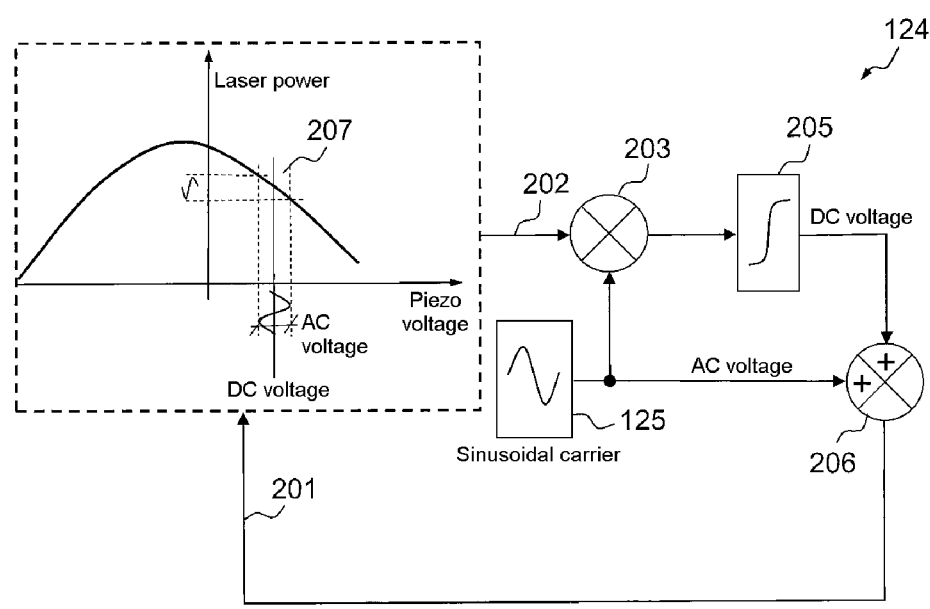
FIG. 2 represents a diagram of an exemplary embodiment of the cavity length locking loop.

FIG. 2 represents an exemplary embodiment of the cavity length locking means 124. The principle used to correct the length of the optical cavity consists in locking the power of the laser signal onto a maximum which appears when the cavity length is equal to a multiple of the wavelength of the optical signals. To this end, a known sinusoidal signal 125 of low amplitude is added to the electrical signal 201 transmitted to the piezo-transducer 128. The signal 202 received by the locking means 124 is demodulated coherently by applying to it a multiplication 203 by said pure carrier signal 125, then an integration 205 in order to determine the slope 207 of the laser power signal which should then be corrected by adding 206 this value to the piezo-transducer control signal 201.

Other embodiments of the optical cavity length locking means 124 which fulfil the same function can be envisaged without departing from the context of the invention.

In the case of a triaxial gyrolaser, an additional matrix-producing operation is inserted before digital-analogue conversion 126 in order to reduce the conversion to cavity axis. The aim is a transitional matrix making it possible to transpose the reflection axes of the mirrors of the optical cavity towards the optical axes of the photo-detectors.

Activation Locking

A gyrolaser also comprises a mechanical activation wheel 135 whose function is to ensure a permanent movement of the cavity in order to avoid the known blind region phenomenon, namely a region in which the gyrolaser does not detect the rotation of the mobile carrier when the rotation velocity is low. To overcome this phenomenon, the activation wheel 135 imparts an oscillation movement, also called activation, on the cavity of the gyrolaser.

The activation wheel 135 is a mechanical device of mass-spring type having a specific resonant frequency. Activation locking means 130 are charged with maintaining the oscillation of the wheel 135 on its fundamental frequency and with a constant given amplitude.

To this end, the wheel 135 comprises means 135a for detecting its oscillatory movement which convert the oscillation velocity into an electrical signal which is amplified 133 and digitized 131. The activation locking means 130 determine a correction signal as a function of a reference setpoint 129 in amplitude and in phase. Said signal is converted by analogue means 132 then amplified 134 before being applied to a device 135b, included in the activation wheel 135, making it possible to convert said correction signal into a mechanical force imparted on said wheel so as to lock its oscillatory movement onto the reference setpoint 129. Such a device 135b may, for example, consist of a piezoelectric motor.

Figure 3:
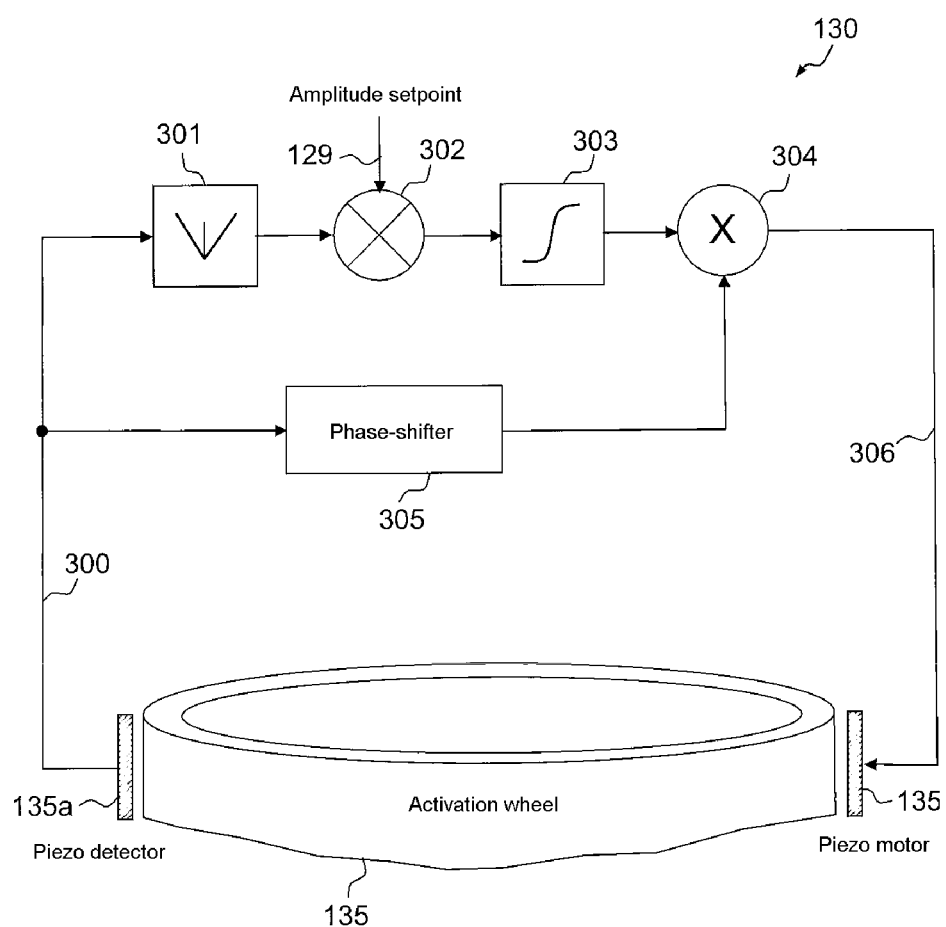
FIG. 3 represents a diagram of an exemplary embodiment of the activation locking loop.

FIG. 3 represents an exemplary embodiment of the activation locking means 130. The sinusoidal electrical signal 300 delivered by the detection means 135a is an estimation of the oscillation movement of the wheel 135. It is rectified 301 then subtracted 302 from an amplitude setpoint 129 and integrated 303. The integrator 303 produces at its output a variable gain which corresponds to the signed error between the amplitude of the sinusoidal signal 300 and the setpoint 129. This gain is then injected onto the oscillation signal 306 applied to the motor device 135b, via a multiplier 304. Thus, a locking of the amplitude of the oscillation signal 306 on a controlled amplitude value 129 is performed.

For the activation of the wheel 135 to be effective, it is necessary to produce an oscillation condition by imparting a phase shift 305 between the signal 300 obtained from the detection means 135a and the oscillation signal 306. This oscillation condition makes it possible to maintain the movement of the wheel on a resonant frequency. To this end, the phase shift 305 should correspond to the resonant frequency of the wheel 135.

As an example, the phase shift value may be substantially equal to 180° or to 90° if the detection means 135a are implemented by a piezoelectric detector.

A phase shift 305 by a value equal to θ may be produced by an analogue or digital filter whose phase is substantially equal to θ for frequency values substantially equal to the resonant frequency of the oscillating system. It may also be produced by a phase-locked loop or by any other means making it possible to impart a fixed phase shift on a sinusoidal signal 300.

For the correct operation of the system, it is important for the oscillation of the wheel 135 to be maintained at a constant amplitude. In practice, the impact of this known activation movement may be eliminated by digital processing operations, situated downstream of the means 118 for measuring the angular velocity, in order to retain only the useful movement from the movement of the gyrolaser. These processing operations require a calibration and an instability in the activation amplitude induces a bias instability at their output.

One drawback in the activation locking principle described hereinabove lies in the use of detectors 135a which may suffer from non-repeatable defects due to wear over time. Their transfer function may thus be affected leading to detection errors which cannot be compensated for by the activation locking means 130 because they are not measured at any moment.

The present invention proposes a solution making it possible notably to resolve this problem by doing away with the use of such a detector 135a.

Figure 4:
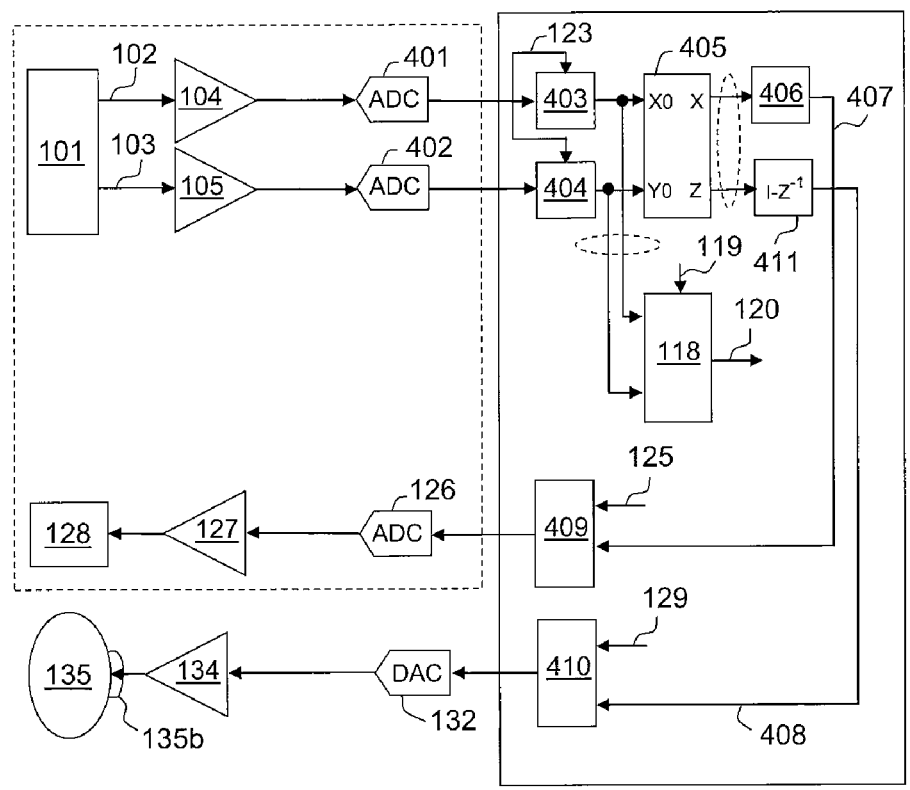
FIG. 4 represents a diagram illustrating the device according to the invention for digitally processing information obtained from a gyrolaser.

FIG. 4 represents the processing electronics of a gyrolaser according to the invention. The analogue part of the device is considerably smaller compared to the prior art solution represented in FIG. 1. The optical signals in phase quadrature delivered by the photo-detector 101 are amplified by two low-noise and constant-gain amplifiers 104, 105 then directly digitized 401, 402. Means 403, 404 for scaling the signals provide an automatic gain control of said digitized optical signals and their pairing so that the gain obtained on the two channels is substantially identical. The bandwidth of the automatic gain control produced in this way should be low enough not to mask the modulated carrier 125 for the locking of the cavity length. The expression "low enough" should be understood to mean a bandwidth at least less than a decade of the modulation frequency of the carrier 125. In the case of photo-detectors 101 that have a good repeatability, the scaling means 403, 404 may be optional.

The optical signals, possibly amplitude corrected, are then considered as a complex signal of which each digital sample can be represented by a complex vector whose rotation frequency contains the angular velocity information which is modulated by the self-oscillation of the activation wheel 135. Furthermore, the carrier 125 used by the cavity length locking means modulates the amplitude of the optical signals and therefore indirectly the modulus of said complex vector.

The device according to the invention then comprises means 405 for extracting the phase and the modulus of the complex vector representing the pair of optical signals in phase quadrature. In a particular embodiment of the invention, the phase and modulus extraction means 405 are produced by a Cordic algorithm used in its Y-reduction mode. In practice, if the Cordic algorithm is applied to the vector V=I+ jQ and the remainder is reduced according to Y, the outputs $X_n$, $Z_n$ of the algorithm converge after n iterations towards the following values:

$$X_n = A_n \cdot [I^2 + Q^2] = A_n \cdot \rho^2$$

$$Z_n = \operatorname{Arc\,tan}(I/Q) = \alpha$$

where $A_n$ is the gain of the algorithm dependent on the number n of iterations, $\rho$ is the modulus of the complex vector, and $\alpha$ is the phase of the complex vector. There is therefore obtained, after n iterations, an image of the square of the modulus of the complex vector and an image of its phase.

Other means for calculating the modulus and the phase can be used without departing from the context of the invention, in particular the modulus may be determined directly by the following expression $\rho = \sqrt{I^2 + Q^2}$ and the phase $\alpha$ may be determined by using a precomputed table of the output values of the arc tangent function.

The device according to the invention comprises optical cavity length locking means 409 which receive as input, on the one hand, a carrier signal 125 of known modulation factor a and pulsation $\omega$ and, on the other hand, the square of the modulus of the complex vector, possibly filtered by a low-frequency filtering 406. In practice, the modulus of the complex vector at the output of the extraction means 405 is expressed: $\rho = A + \alpha \sin(\omega \cdot t)$. Raising it to the power of two gives the following result:

$$\rho^2 = (A + \alpha \cdot \sin(\omega t))^2 = A^2 + \alpha^2 \cdot \sin^2(\omega t) + 2 \cdot A \cdot \alpha \cdot \sin(\omega t)$$

Thus, the low-frequency filtering 406 associated with a subtraction of the continuous component $A^2$ makes it possible to retain only the term $2 \cdot A \cdot \alpha \cdot \sin(\omega t)$ which contains the information concerning the characteristics of the carrier 125 and which replaces the signal 202 at the input of the locking device 124 described in FIG. 2. The rest of the processing operations making it possible to produce a correction signal 201 are identical. They consist in estimating the slope of the curve $2 \cdot A \cdot \alpha \cdot \sin(\omega t)$ as a function of time and correcting the electrical signal applied to the control means 128 as a function of this slope.

In a variant embodiment, the locking means 409 may also be applied to the modulus $\rho = A + \alpha \sin(\omega \cdot t)$ obtained by applying a square root to the output X of the device 405.

The device according to the invention further comprises activation locking means 410. Unlike the prior art solution, the oscillatory movement information from the activation wheel 135 is not obtained through a detector included in said wheel but from the angle $\alpha$ of the complex vector delivered by the extraction means 405, to which is applied a derivator 411 making it possible to obtain the corresponding pulsation $\Omega$ 408 and, indirectly, the frequency F. The pulsation $\Omega$ 408 comprises both the activation oscillatory movement information but also the movement of the mobile supporting the gyrolaser. It is then best to extract only the activation information, that is to say, the resonant frequency $F_0$ and the amplitude $A_0$ of the oscillation movement of the wheel 135, in order to be able to perform the locking of the oscillation frequency and of its amplitude relative to a reference 129. For this, two methods according to the invention are possible.

A first method consists in applying a high-pass filtering to extract only the activation information which is spectrally separated from the movement information of the carrier. In practice, the oscillation movement imparted on the gyrolaser has a frequency very much higher than that of the movement of the gyrolaser itself or of the carrier on which it is embedded. As a nonlimiting example, the frequency of the oscillation movement is typically of the order of several hundreds of Hertz whereas the frequency of the movement of the carrier is generally about ten Hertz. Thus, it is possible to isolate the oscillation movement information by eliminating the low frequencies through the intermediary of a high-pass or band-pass filter.

A second method consists in performing an inter-channel correlation of the three signals obtained in the case of a triaxial gyrolaser. With the activation movement being correlated on all three channels, this correlation is exploited from the intercorrelation matrix of the signals 407 representing the phase $\alpha$ obtained on each of the channels corresponding to an angular velocity on each axis of a trihedron.

Once the estimation 408 of the oscillation movement has been determined, the locking means 410 apply a method identical to that described in FIG. 3, for example a phase-locked loop or a phase-shifting filter.

The exploitation of the phase of the complex vector formed by the two optical signals makes it possible to avoid the use of a motion detector positioned on the activation wheel. The activation amplitude obtained is substantially more accurate than by the use of an activation sensor according to the prior art since the device according to the invention directly exploits the optical signal containing the real movement information and not an image affected by defects inherent to such detectors.

The angular velocity signal 120 is determined by conventional measurement means 118 applied to the digitized optical signals, sampled at a rate 119 and possibly corrected 403, 404 in power.

The device according to the invention described on the basis of FIG. 4 is suitable for a mono-axial gyrolaser but the invention is not limited to this case and extends notably to the triaxial gyrolasers which allow for a measurement of the angular velocity on the three axes from a single optical block. In the latter case, all the elements that the device according to the invention includes are triplicated in order to produce three angular velocity measurements 120 on each of the axes. Only the activation wheel 135 and its control elements 132, 134 are not triplicated. An additional matrix-producing operation must be inserted between the cavity length locking means 409 and the digital-analogue converter 126 in order to obtain a correction on the axis of the cavity.

The activation function 135 must be performed as soon as the gyrolaser is started up to avoid the mirror marking phenomenon. The activation locking means 410 according to the invention use the optical signals 102, 103 to extract therefrom the activation oscillatory movement information, so consequently the activation 135 cannot be performed directly on starting up the gyrolaser. Without oscillation, the laser signal risks marking the mirror which is immobile on start up. To overcome this drawback, a frequency pulse or a pulse train is produced digitally and substituted for the nominal control to be used on start ups such as motive excitation of the activation wheel.

The invention makes it possible to reduce the number of analogue stages by a factor roughly equal to 50% in the case of a mono-axial or triaxial gyrolaser.

The invention claimed is:
1. A gyrolaser with optical cavity, comprising:
   a plurality of mirrors,
   at least one photo-detector delivering two optical signals in phase quadrature, said signals being digitized,
   means for controlling a position of one of said mirrors by conversion of an electrical signal into a mechanical force, means for activating said gyrolaser in an oscillatory movement by conversion of an oscillation electrical signal into the mechanical force, means for measuring an angular velocity of said gyrolaser, means for extracting a phase $\alpha$ and a modulus $\rho$ or a square of the modulus $\rho$ of a vector whose real part is formed by one of the two digitized signals and an imaginary part is formed by the other digitized signal, said modulus $\rho$ representing an amplitude of said optical signals and its square representing their power, means for locking a length of the optical cavity onto a multiple of a wavelength of said optical signals by an estimation of a slope of a curve of variation of the amplitude or of the power as a function of time, said means producing a correction signal determined as a function of said slope and applied to said control means, a derivator applied to the phase a over a given period of time in order to produce a signal comprising an overall movement information, including an oscillatory movement, for said gyrolaser, and means for locking an activation of said gyrolaser onto said oscillatory movement, receiving said signal, extracting from which an estimation of the oscillatory movement imparted on said gyrolaser by said activation means and producing said oscillation signal whose amplitude is locked onto a given amplitude setpoint.

2. The gyrolaser according to claim 1, wherein the extraction of an estimation of the oscillatory movement is performed by a filtering eliminating, from said signal, the low frequencies below a given threshold.

3. The gyrolaser according to claim 2, wherein said activation locking means further comprise:

means for rectifying said estimation of the oscillatory movement, means for subtracting the result of the rectification from an oscillation amplitude setpoint, means for integrating the result of the subtraction over a given time period, and means for multiplying the result of the integration with said estimation phase-shifted by a given phase $\theta$ to obtain said oscillation signal.

4. The gyrolaser according to claim 3, wherein the phase shifting is performed by a phase-shifting filter or a phase-locked loop.

5. The gyrolaser according to claim 4, wherein said phase $\theta$ has a value of 180° or 90°.

6. The gyrolaser according to claim 5, wherein said means for locking the length of the optical cavity carry out at least the following steps:

addition of a reference sinusoidal signal of given frequency and amplitude to the correction signal for said means for controlling the position of a mirror of said cavity, and coherent demodulation of the amplitude or of the power of said signals.

7. The gyrolaser according to claim 6, wherein the coherent demodulation is performed by the following steps:

multiplication of the amplitude or of the power of said signals by said sinusoidal signal of given frequency and amplitude, integration of the result of the multiplication over a given time period, and addition of the result of the integration and of said sinusoidal signal to produce said correction signal.

8. The gyrolaser according to claim 7, wherein said extraction means execute a Cordic algorithm in a Y-reduction mode.

9. The gyrolaser according to claim 8, wherein said square of the modulus p is filtered by a low-frequency filter.

10. The gyrolaser according to claim 9, further comprising automatic gain control means for locking the amplitude or the power of said signals onto a reference gain value.

11. The gyrolaser according to claim 10, wherein said control means comprise a piezo-transducer.

12. The gyrolaser according to one claim 11, wherein said activation means comprise a mechanical activation wheel and a piezoelectric motor.

13. The gyrolaser according to claim 12, wherein said measurement means carry out a counting/downcounting of the pulses of said signals.

14. The gyrolaser according to claim 13, wherein it performs a measurement of the angular velocity according to the three axes of a trihedron and the means for locking the length of the optical cavity further comprise a matrix-producing operation making it possible to transpose the reflection axes of the mirrors of the optical cavity towards the optical axes of the photo-detectors.

15. The gyrolaser according to claim 14, wherein the extraction of an estimation of the oscillatory movement is determined from the intercorrelation matrix of the three signals obtained by derivation of the phase a of said optical signals obtained for each of the three axes.

* * * * *